Aug. 16, 1927.
T. G. TINSLEY
PERCOLATOR
Filed Aug. 28, 1926
1,638,969
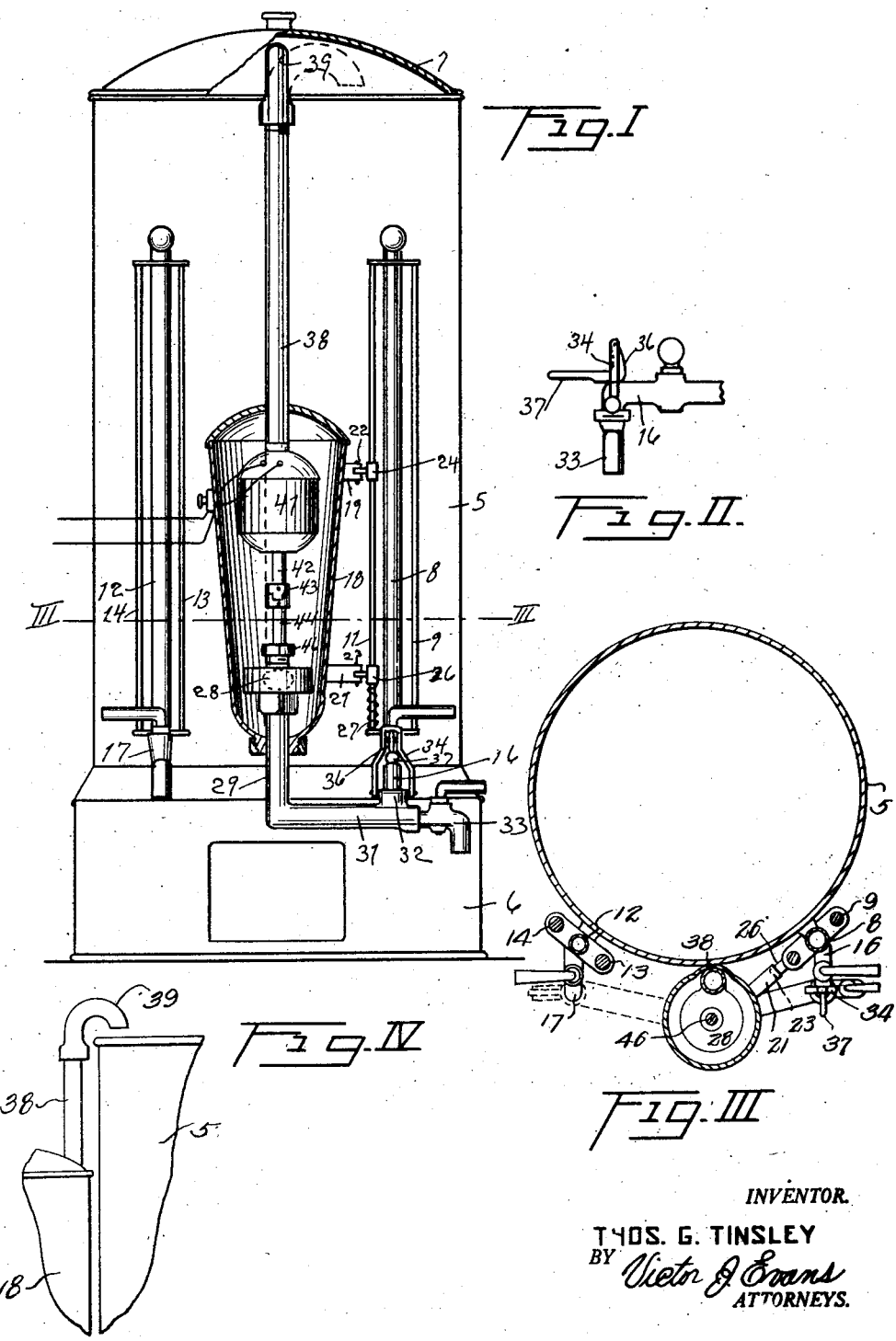
INVENTOR.
THOS. G. TINSLEY
BY *Victor J Evans*
ATTORNEYS.

Patented Aug. 16, 1927.

1,638,969

UNITED STATES PATENT OFFICE.

THOMAS G. TINSLEY, OF PORTLAND, OREGON.

PERCOLATOR.

Application filed August 28, 1926. Serial No. 132,247.

This invention relates to improvements in coffee percolators and has particular reference to an attachment whereby the coffee or hot water may be withdrawn from the bottom of the percolator and discharged into the top of the percolator.

Another object is to provide means which may be attached to any ordinary percolator now upon the market without altering the construction of the same.

A further object is to produce a device of this character which is cheap to manufacture and one which is well within the purchase price of the average user.

A further object is to provide a percolator which is neat in appearance and one which may be easily cleaned and will not introduce unsanitary conditions within the percolator.

Other objects and advantages will be apparent during the course of the following description.

In the accompanying drawings forming a part of this specification and in which like numerals are employed to designate like parts throughout the same, Figure I is a side elevation of a percolator having my attachment secured thereto and partly shown in cross-section.

Figure II is a fragmentary detail view showing the manner of attaching my device to one of the faucets of the percolator, Figure III is a cross-section taken on the line 3—3 of Figure I, and Figure IV is a fragmentary detail view showing the manner in which the device discharges into the percolator.

In restaurants and similar places where a large percolator is used, it is now common for one of the employees to draw the coffee from the percolator into a pitcher and then pour the same into the top of the percolator, or if fresh coffee is being made, then it is common to draw hot water from the water side of the percolator and to pour the hot water into the top of the percolator.

This pouring act causes the water or coffee to pass over the grounds contained in the top of the percolator. This is a quick method of securing coffee when the supply has become low or weakened. I have devised means whereby the contents of the percolator may be withdrawn from the usual faucets and redeposited in the top of the percolator in a manner which will not expose the operation.

In the accompanying drawings wherein for the purpose of illustration is shown a preferred embodiment of my invention the numeral 5 designates the percolator as a whole having a base 6 and a cover 7. This percolator is of the usual construction and has a coffee gauge 8 and guard rods 9 and 11. A similar hot water gauge is shown at 12 which is also provided with guard rods 13 and 14.

A faucet 16 connects with the coffee gauge, while a faucet 17 connects with the hot water gauge. The description thus far merely refers to the customary coffee percolator to which I attach my device which consists of a casing 18 having arms 19 and 21 which are pivoted as at 22 and 23, respectively, to sliders 24 and 26, respectively.

These sliders are movable upon the guard rod 11. A spring 27 coiled upon the guard rod 11 serves to support the slider 26 and consequently the remainder of my device.

Within the casing 18 is a centrifugal pump 28 to the bottom of which is attached a pipe 29. This pipe has formed integral therewith and at right angles thereto a horizontal section 31, and has a protuberance 32 which is adapted to engage either the faucet 16 or the faucet 17.

It is of course understood that this protuberance 32 is apertured so as to form a connection with the faucet to which it is attached and the interior of the pipe 31. An auxiliary faucet 33 is attached to the pipe 31 the purpose of which is obvious.

The manner of attaching this protuberance to the faucet is by a yoke 34 which is pivoted thereto and which carries a cam 36 operated by a lever 37. This yoke and cam construction is best illustrated in Figure II.

Extending from the outer periphery of the rotary pump 28 is a pipe 38 which extends upwardly, terminating in a goose neck 39. This goose neck may be rotated so that its open end will overlie the percolator.

Within the casing 18 is positioned a motor 41 which is connected by means of a shaft 42 to a coupling 43. This coupling is in turn connected to a shaft 44 which shaft extends through a stuffing box 46 and enters the centrifugal pump for the purpose of rotating the pumping element.

The result of this construction is that when the device is in use and it is desired to draw the coffee from the side of the percolator and discharge the same into the top of the percolator, so that the fluid will pass over the grounds, the pipe 31 is moved to a position so that the protuberance 32 will underlie the faucet 16 to which it is clamped through the medium of the yoke 34 and cam 36.

By now opening the valve in the faucet 16 and by starting the motor 41, coffee will be withdrawn from the faucet 16, through pipe 21, pipe 29, through centrifugal pump 28, thence by pipe 38, from which pipe it will be discharged through goose neck 39 onto the grounds in the percolator.

Should it be desired to withdraw hot water from the water side of the percolator the pipe 31 will be swung to the dotted line position of Figure III and the same operation performed as above described.

It will thus be seen that I have provided a very simple means for accomplishing the objects set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a coffee percolator attachment, the combination with the percolator having a pair of faucets, a casing resiliently mounted on said percolator and adjacent said faucets, a motor positioned with said casing, a pump positioned within said casing and adapted to be rotated by said motor, a pipe extending from said pump to a point adjacent the upper extremity of said pump, a goose neck secured to said pipe and adapted to be moved so as to discharge fluid therefrom into said percolator, a pipe extending from said pump downwardly and horizontally, a faucet carried in said last mentioned pipe, a protuberance formed on said horizontal portion of said pipe, said protuberance being adapted to be clamped to either of said faucets of said percolator.

In testimony whereof I affix my signature.

THOMAS G. TINSLEY.